Jan. 12, 1926.  1,569,166
F. AMATO
AUTOMOBILE BUMPER
Filed Dec. 20, 1923  2 Sheets-Sheet 1
Fig.1.
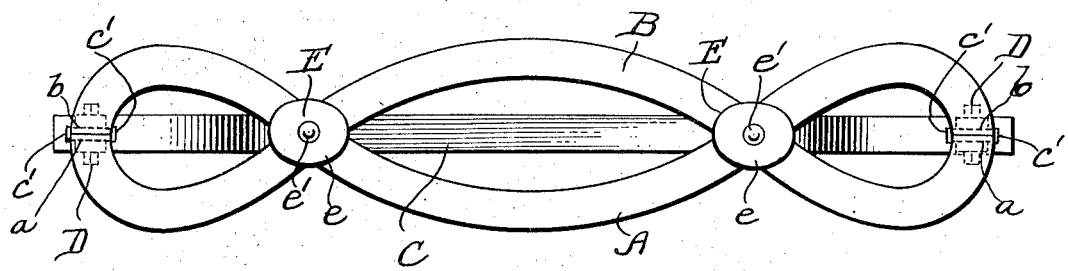
Fig.2.
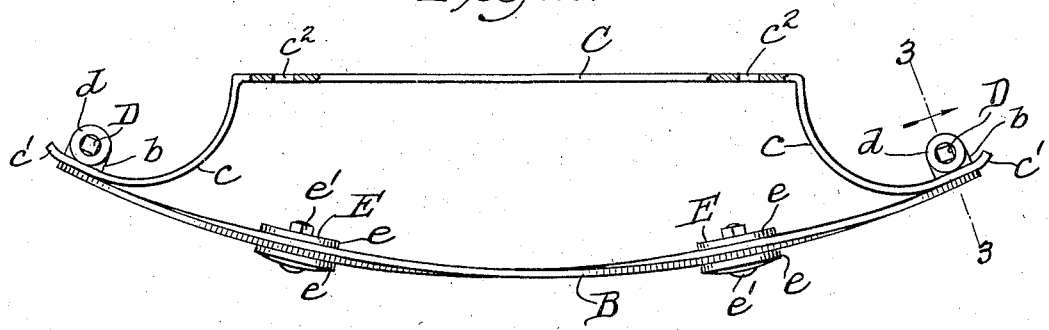
Fig.3.
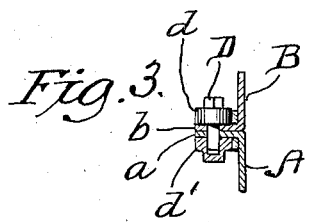
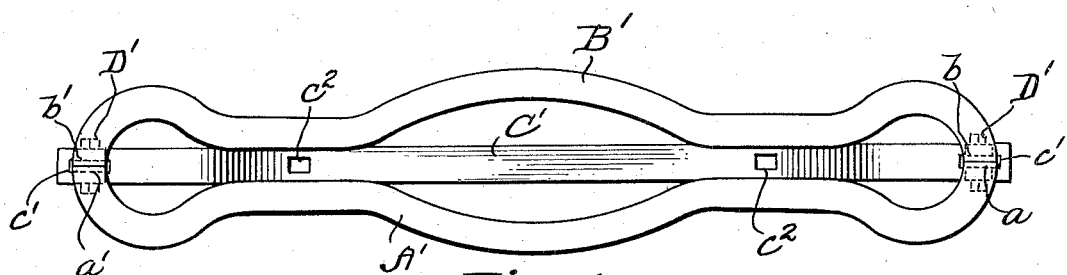
Fig.4.
INVENTOR,
Frank Amato
BY N. J. Bernhard
ATTORNEY.

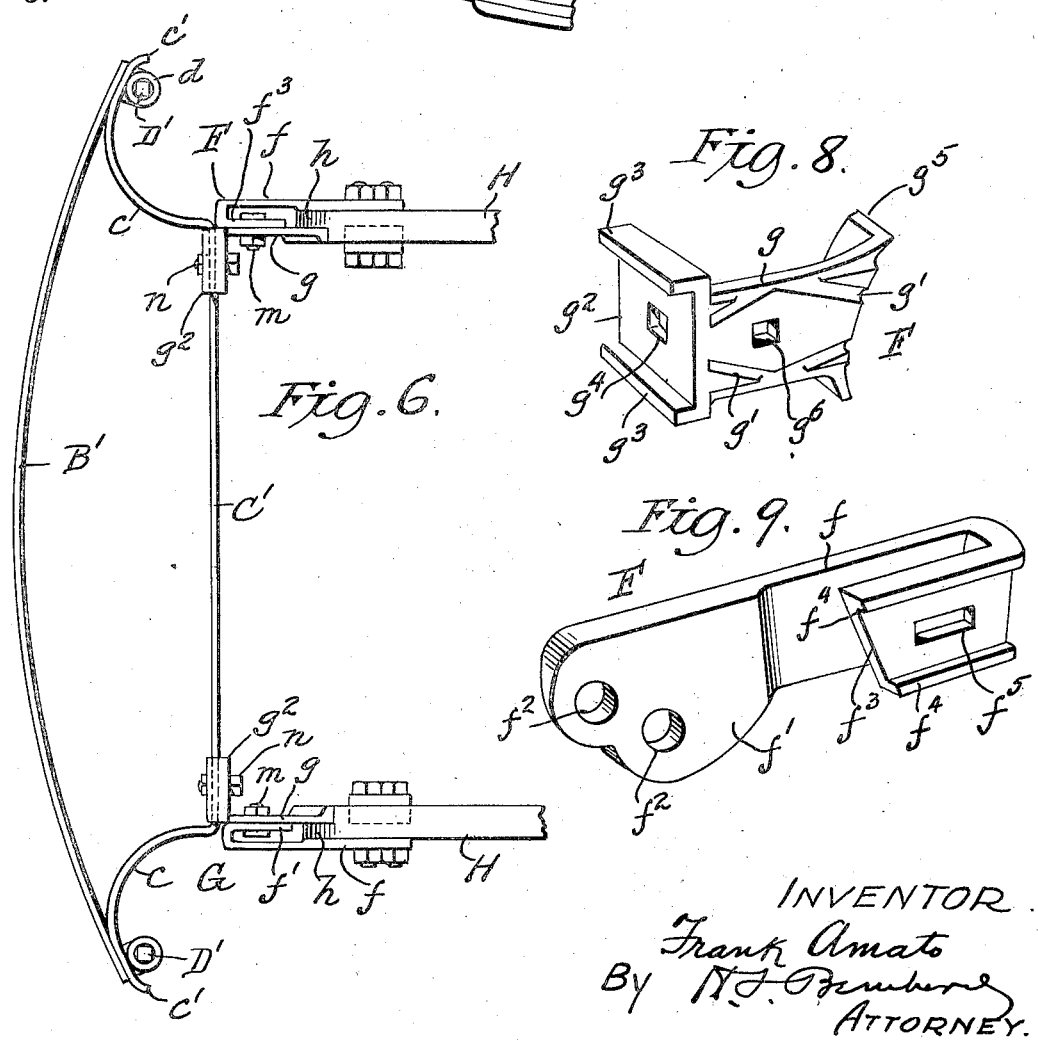

Patented Jan. 12, 1926.

1,569,166

UNITED STATES PATENT OFFICE.

FRANK AMATO, OF LONG ISLAND CITY, NEW YORK.

AUTOMOBILE BUMPER.

Application filed December 20, 1923. Serial No. 681,713.

*To all whom it may concern:*

Be it known that I, FRANK AMATO, a citizen of the United States, residing at Long Island City, county of Queens, and State of New York, have invented a certain new and useful Automobile Bumper, of which the following is a specification.

This invention is a fender for vehicles, and, more particularly, for motor vehicles, the objects being, first to cushion the shock and blow on the various parts of a motor vehicle should it accidentally collide with another vehicle or meet with an obstruction; second, to yieldingly and securely mount the fender upon the chassis of a vehicle; third, to adapt the fender mounting for use in connection with the underframing or chassis of different makes of motor vehicles, and, fourth, to simplify the construction with a view to attaining efficiency in service and economy of manufacture.

To these ends, my invention comprises a novel construction of the fender, and, further, a supporting means for said fender, as will be hereinafter described and claimed.

Other functions and advantages of the invention will appear from the following description taken in connection with the drawings, wherein—

Figure 1 is a front view of one form of bumper.

Figure 2 is a plan view thereof.

Figure 3 is a cross section on the line 3—3 of Figure 2.

Figure 4 is a front elevation of a modified form of the bumper.

Figure 5 is a side elevation of another modified form of bumper together with a bracket for mounting the same on the chassis of an automobile.

Figure 6 is a plan view of the parts shown in Figure 5.

Figure 7 is a horizontal sectional view through the bracket and a part of the bumper shown in Figures 5 and 6.

Figures 8 and 9 are detail views of the two parts composing the bracket shown in Figures 5, 6, 7.

In Figures 1, 2, 3, 4, 5 and 6 I have illustrated three forms of bumper each of which three forms is in accordance with my invention. In each form the bumper is composed of three parts, two of which are front members and the third a rear member, all united or coupled by means which afford the required stability.

One form of bumper is shown in Figures 1, 2 and 3 wherein the front members A B are in crossing relation and the rear member C is coupled to the front members at the ends thereof. Each front member A or B is a plate, bar or length curved from end to end in a plane transverse to the length, said members A, B, being curved or bowed lengthwise. The member A is fastened reversely to member B, and vice versa, and said member A is provided at the two ends thereof with rearwardly extending arms $b$, whereas the other member B is similarly provided at the ends thereof with other rearwardly extending arms $a$. The members A B are assembled in such manner that they cross or intersect at two points intermediate the ends, as clearly shown in Figure 1, and the arms $b$, of member A lap over the arms $a$ of member B, see Figure 3. The lapping arms $a$ $b$ of the two members are positioned at the rear of said members, and these arms $a$, $b$, are provided with openings for the reception of bolts D, the latter passing through the openings and coupling the parts A B in fixed relation one to the other.

The crossing members A B are coupled, also at their points of intersection by a suitable form of coupling E, the same being shown in Figures 1 and 2 as comprising plates $e$ and bolts $e'$.

The plates $e$ are fitted to the front and rear sides of the members at the points where they cross or intersect, and the bolts $e'$ pass through the plates and the members in a manner to be tightened and thereby clamp the members A, B together by the frictional binding effect of the bolts $e'$ on the plates $e$, the latter being in frictional contact with the members A B.

The rear member C is composed of a spring bar bent intermediate its ends to produce the curved legs $c$, the ends of which are slotted at $c'$. These slotted ends $c'$ of said leg $c$ are fitted against the rear faces of the members A B at the ends thereof, the slots $c'$ receiving the rearwardly bent arms $a$, $b$, of said front members. Said slotted ends $c'$ of the rear member C lie between the ends of the front members and the bolts D, see Figures 2 and 3, and said slotted ends of the rear member C are thus united or attached to the end portions of the front members A B, whereby the three members are coupled at their end portions so as to leave the intermediate portions of the said front members free to flex and yield under the impact of an obstacle.

The slotted ends of the rear member are in contact with a smooth shoulder $d$ and with the smooth face of a nut $d'$, said shoulder being integral with the bolt and the nut being screwed on said bolt, whereby the slotted end of the rear member is free to have a limited movement relatively to the arms $a$ $b$ of the front members and to the bolt D, and vice versa, the arms $a$ $b$ and the bolt may slide to a limited extent relatively to the slotted end portions $c'$ under the shock on the front members A B.

The rear member C is provided with openings $c^2$ for the reception of bolts carried by brackets hereinafter described whereby the rear member is fixedly supported by the brackets, said rear member C serving as the supporting means for the front members A B.

The bumper shown in Figures 4, 5 and 6 is similar in its main structural features to the bumper hereinbefore described in connection with Figures 1, 2 and 3, i. e. the bumper of Figures 4, 5 and 6 comprising a plurality of front members A', B', a rear member C', the arms $a'$, $b'$, on the front members and extending rearwardly thereof, and bolts D' for coupling the arms $a'$, $b'$, in fixed relation and for coupling the slotted ends of the rear member C' to the arm formed ends of the front members. As in the construction of Figures 1 and 2, the bumper of Figures 4, 5 and 6 should be provided with couplings of the same character as the couplings E of Figures 1 and 2, said couplings when used in the bumper of Figures 4, 5 and 6 being applied to the members A' B' in the manner shown in Figures 1 and 2 for holding the two front members A' B' in fixed relation one to the other. In this form of the bumper, the front members are curved lengthwise and they are bowed, each front member A A' and B B' being of sinuous formation, but whereas members A B are sinuous to cross each other the members A' B' are sinuous to the extent shown in Figure 4 so that they do not cross or intersect. When such couplings are used on the bumper of Figures 4, 5 and 6, the bolts for the couplings pass between the adjacent edges of the members A' B' so as to clamp the coupling plates to the rear and front faces of said members A' B', whereby the couplings unite the members intermediate the ends so as to preclude relative movement of the members A' B'. As shown, the rear member C' is provided with bolt holes $c^2$ for attaching said member C' to the brackets, whereby the bumper as an entirety is supported in a fixed position upon the chassis although the spring members composing said bumper are free to flex under the impact of an obstacle.

Any suitable means may be employed for mounting the bumper on an automobile, but in Figures 5 to 9, inclusive, there are shown a plurality of brackets F, G, for attaching the bumper to the chassis of a car, said chassis being shown in the form of channel members H having the curved front ends or "goose necks" $h$, so-called. The brackets F G are duplicates, so that a description of one will answer for the other.

Each bracket (F or G) embodies two parts $f$, $g$, a clamp $i$ and a bolt $j$. The bracket part $f$ is a single casting which may be uniform in width as shown in Figure 5 or it may be enlarged at one end to produce a face plate $f'$ having bolt holes $f^2$, said part $f$ being formed with an arm $f^3$, which arm is provided with parallel flanges $f^4$ and a longitudinal slot $f^5$, see Figure 9.

The bracket part $g$ is also a single casting in the form of a plate with grooves $g'$ in one face thereof, said part being enlarged at one end to provide a head $g^2$ provided with parallel flanges $g^3$ and a bolt hole $g^4$, said head $g^2$ extending at a right angle to the length of the plate $g$. At the other end, the plate is formed with a flange $g^5$, and intermediate its ends said plate $g$ is formed with a bolt hole $g^6$.

The bracket is positioned for use by fitting the part $f$ against one face of the curved end $h$ of the channel bar chassis H as shown in Figure 6, and by adjusting the clamp $i$ into contact with said chassis bar for the hook $k$ to engage therewith, said bolt $j$ of the clamp $i$ being a U-bolt the legs of which pass through the bolt holes $f^2$ of the face plate $f'$ so as to receive the nuts $j'$, see Figure 7. The body or plate $g$ of the other bracket part is fitted against the arm $f^3$ and between the flanges $f^4$ so as to retain the part $g$ against pivotal movement relatively to the bracket part $f$, the bolt hole $g^6$ of the part $g$ being in register with the slot $f^5$ of the part $f$ so as to receive a bolt $m$, whereby the bracket part $g$ is fastened in fixed relation to the bracket part $f$ although the bolt $m$ may be loosened for the part $g$ to be shiftable relatively to the part $f$. The head $g^2$ of the part $g$ receives the rear member C or C' of the bumper, the flanges $g^3$ of said head engaging with the edges of the bumper part and precluding relative movement between the parts, after which a bolt $n$ passes through the bolt hole $g^4$ of part $g$ and through the bolt hole $c^2$ of bumper part C or C' so as to fixedly attach the bumper to the bracket.

The brackets F G extend forwardly of the chassis H, and the rear member of the bumper is fixedly attached to the brackets F G so as to support the bumper as an entirety in a stable position upon the chassis. The parts *f g* of each bracket are relatively adjustable for adapting the brackets to cars of different makes and for supporting the bumper in the required relation to the car structure or the equipment. The arm $f^3$ of the bracket part *f* is spaced from the body of said part to provide an opening in which is received a marginal portion of a permanent fender on certain kinds of automobiles.

The brackets are simple in construction and easily attached so as to firmly support the bumpers. The bumper consists of few parts, each economically manufactured, and adapted for quick assemblage so that a car can be equipped with front or rear bumpers at low cost of installation.

Having thus fully described the invention, what I claim as new and desire to secure by Letters Patent is:

1. A bumper embodying a plurality of curved front members the end portions of which are flanged rearwardly of said members, means for fixedly attaching said flanged ends of the front members, a rear member positioned for the end portions thereof to have slidable engagement with the connected end portions of the front members, and car-attaching means for said rear member.

2. A bumper embodying a plurality of front members the end portions of which are attached together, a rear member the end portions of which are connected slidably to the attached end portions of the front member, and car-attaching means for said rear member.

3. A bumper embodying a plurality of front members the end portions of which are attached together, a plurality of couplings for uniting the front members intermediate the ends thereof, and a rear member free from connection with the central portions of said front members, said rear member having its end portions slidably connected to the attached end portions of the front members.

4. A bumper including a plurality of front members provided with arms, a rear member having slotted ends, and coupling bolts rigidly connecting the arms of the front members and co-operating with the slotted ends of the rear member for retaining all the said members in co-operative relation.

5. In a bumper, a plurality of supporting brackets each including a chassis-engaging part provided with an offset slotted arm, a bumper engaging part having a channeled head for the bumper, and provided with a member adapted for contact with a chassis, means for fixedly attaching the chassis engaging part to a chassis, and separate means for fixedly attaching the bumper engaging part to the offset arm of the chassis engaging part.

In testimony whereof I have hereto signed my name this 18th day of December, 1923.

FRANK AMATO.